United States Patent [19]

Koizumi et al.

[11] 4,236,196
[45] Nov. 25, 1980

[54] SWITCHING REGULATOR

[75] Inventors: Akio Koizumi, Tokyo; Hiroshi Nakazawa, Kawagoe, both of Japan

[73] Assignee: Sony Corporation, Tokyo, Japan

[21] Appl. No.: 968,136

[22] Filed: Dec. 11, 1978

[30] Foreign Application Priority Data

Dec. 16, 1977 [JP] Japan ................................ 52-151341

[51] Int. Cl.³ .......................................... H02M 3/335
[52] U.S. Cl. ...................................... 363/21; 363/80; 323/DIG. 1
[58] Field of Search ..................................... 363/18–21, 363/79–80, 97–98, 131, 134; 323/DIG. 1, 17; 307/300, 252 M, 246

[56] References Cited

U.S. PATENT DOCUMENTS

| 3,638,103 | 1/1972 | Birchenough | 323/DIG. 1 X |
| 3,767,941 | 10/1973 | Crawford | 323/DIG. 1 X |
| 3,872,327 | 3/1975 | Rudert et al. | 307/300 |
| 3,986,052 | 10/1976 | Hunter | 307/300 X |
| 4,087,850 | 5/1978 | Koizumi | 363/80 X |
| 4,121,282 | 10/1978 | Ohsawa | 363/21 |

Primary Examiner—J. D. Miller
Assistant Examiner—Peter S. Wong
Attorney, Agent, or Firm—Hill, Van Santen, Steadman, Chiara & Simpson

[57] ABSTRACT

A switching regulator includes a switching transformer and a switching transistor connected in series between a DC voltage source through the primary winding of the switching transformer. A pulse width modulator and a control pulse signal generator are provided so as to produce a pair of ON- and OFF-pulse signals which are supplied to the control electrode of the switching transistor so as to increase the switching speed thereof.

6 Claims, 8 Drawing Figures

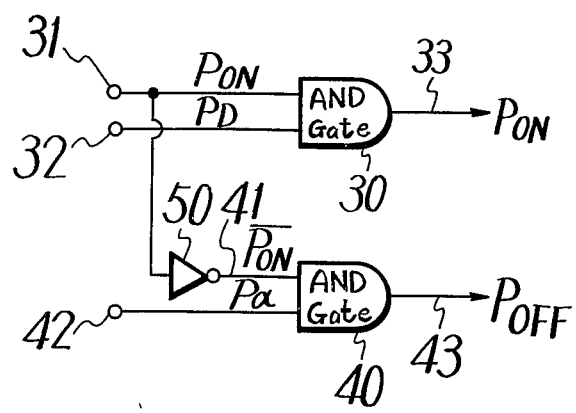
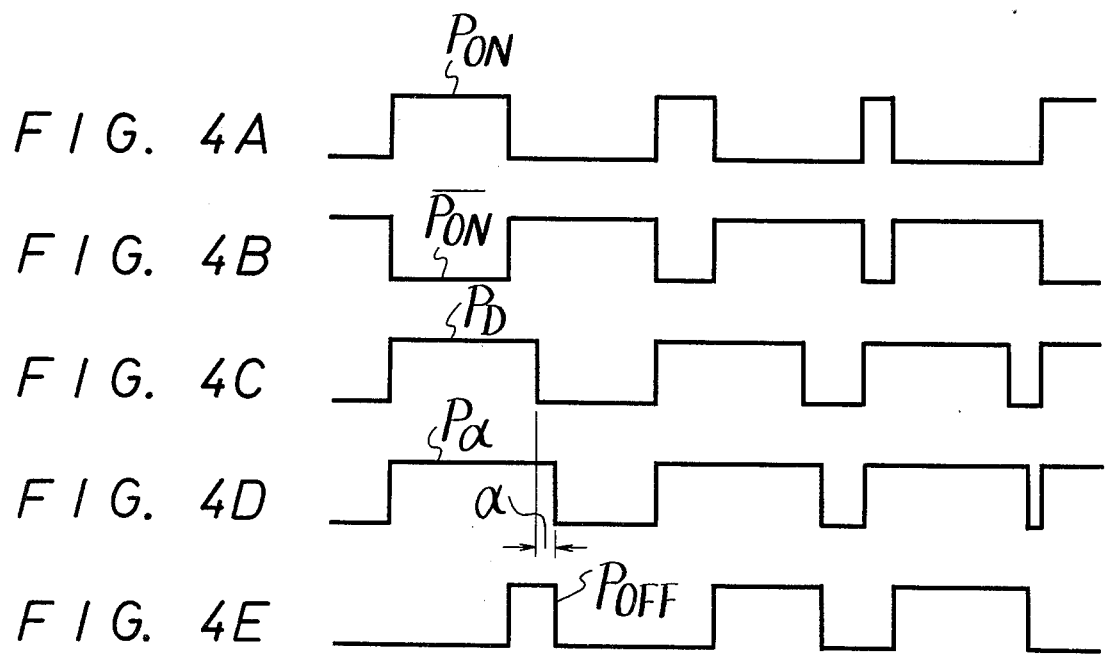

SWITCHING REGULATOR

BACKGROUND OF THE INVENTION

1. Field of the Invention

The present invention relates generally to a switching regulator, and is directed more particularly to a switching regulator in which the switching speed of the switching element thereof can be made high.

2. Description of the Prior Art

In the past, in order to improve the switching speed of a switching element, when the switching element is made OFF, the control potential therefor is drawn to the reverse bias direction and to rapidly discharge an electric charge or carrier, which is stored in the switching element when it is in the ON-state.

An example of the prior art switching power supply circuit or switching regulator so as to improve the switching speed is shown in FIG. 1. In the figure, a power supply plug 1, which is supplied with, for example, commercial power source voltage, is connected through a power supply switch 2 to a rectifier circuit 3 whose output side is grounded through a primary winding 4a of a transformer 4, which has a magnetic core, and a switching element, for example, collector-emitter path of a switching transistor 5. A secondary winding 4b of the transformer 4 is connected to a rectifier circuit 6 which produces a stable DC voltage for a load. The base of the switching transistor 5 is connected to the output side of a drive circuit 7 which is supplied with an electric power from a DC power supply source 8 which is, in turn, connected to the output side of the rectifier circuit 3. The drive circuit 7 includes a transistor 9, which is driven by a PWM (pulse width modulated) signal (i.e., ON-pulse) for carrying out the switching operation, a transistor 10, which is made ON in response to the output from the transistor 9, a transistor 11, which will become ON to drive the switching transistor 5 when the transistor 10 becomes ON, a transistor 13, whose base is connected to the emitter of the transistor 9 through, for example, a differentiating circuit 12 which will produce a pulse, i.e., OFF-pulse to draw the base potential of the switching transistor 5 in the reverse bias direction when it is in OFF-state, and a transistor 14, which will become ON in response to the output from the transistor 13 to connect the base of the switching transistor 5 to the negative voltage side of the DC power supply source 8.

The output side of the rectifier circuit 6 is connected to a voltage detector or detecting circuit 15 which will detect a part of the DC output voltage of the rectifier circuit 6. The output side of the voltage detector circuit 15 is connected through an isolator 16 such as a photocoupler, transformer or the like, which will isolate the primary side of the transformer 4 from the secondary side thereof, to a pulse width modulator 17 which will compare the DC voltage delivered from the voltage detector circuit 15 with a reference voltage and control the pulse width of its output pulse by the compared error signal and hence produce a PWM signal. This PWM signal is applied to the input side of the drive circuit 7, i.e., the base of the transistor 9 to operate the drive circuit 7. The ON-time of the switching transistor 5 is controlled by the drive circuit 7, so that the rectifier circuit 6 produces at the output side thereof a stable DC output voltage.

In the prior art switching regulator or power supply circuit with the construction described as above, in order to make high the switching speed of the switching transistor 5, namely to make short the switching-OFF time of the switching transistor 5, an OFF-pulse, which draws the base potential of the switching transistor 5 in the reverse bias direction, is provided in such a manner that the ON-pulse, which is used to make the switicing transistor 5 ON, is shaped by, for example, the differentiating circuit 12 shown in FIG. 1 to provide the OFF-pulse. Accordingly, when the pulse width of the PWM signal applied from the pulse width modulator 17 to the base of the transistor 9 becomes narrow, there occurs the difficulty that the charge stored on the capacitor of the differentiating circuit 12 becomes insufficient for turning the transistor 13 ON. In other words, since the pulse width of the OFF-pulse is not sufficient, the stored carrier in the switching transistor 5 is not discharged sufficiently and hence the switching frequency can not be made high with the result that the efficiency is deteriorated.

OBJECTS AND SUMMARY OF THE INVENTION

Accordingly, it is an object of the present invention to provide a switching regulator free from the drawbacks encountered in the prior art.

It is another object of the invention to provide a switching regulator in which a pair of ON- and OFF-pulses are provided from PWM signal, a duty ratio limiting pulse and a control pulse, whose duty ratio is selected greater than that of the duty ratio limiting pulse, and a switching transistor is controlled by the ON- and OFF-pulses.

In accordance with one example of the present invention, a switching regulator is provided which includes a DC voltage source having a pair of first and second DC output terminals, a switching transformer having primary and secondary windings and a magnetic core, a switching transistor having a control electrode the main current path of which is connected in series between the first and second DC output terminals through the primary winding, a rectifying circuit connected across the secondary wnding and adapted to be connected with a load, and a pulse width modulator supplied with the output from the rectifying circuit so as to produce a PWM control signal the duty ratio of which is proportional to the voltage of the rectifying circuit, the switching regulator further comprising a control pulse generating circuit for producing a first control pulse signal which limits the maximum duty ratio of the PWM control signal and a second control pulse signal which has the duty ratio larger than that of the first control pulse signal, a gate circuit supplied with the PWM control signal and the first and second control pulse signals so as to produce a pair of ON- and OFF-pulses under comparison result there between, and a circuit for supplying the pair of ON- and OFF-pulses to the switching transistor so as to switch ON or OFF the same.

The other objects, features and advantages of the present invention will become apparent from the following descriptions taken in conjunction with the attached drawings.

BRIEF DESCRIPTION OF THE DRAWINGS

FIG. 3 is a block diagram showing an example of the gate circuit used in the invention shown in FIG. 2; and FIGS. 4A to 4E, inclusive, are waveform diagrams used for explaining an operation of the invention shown in FIGS. 2 and 3.

DESCRIPTION OF THE PREFERRED EMBODIMENT

Figure 1:
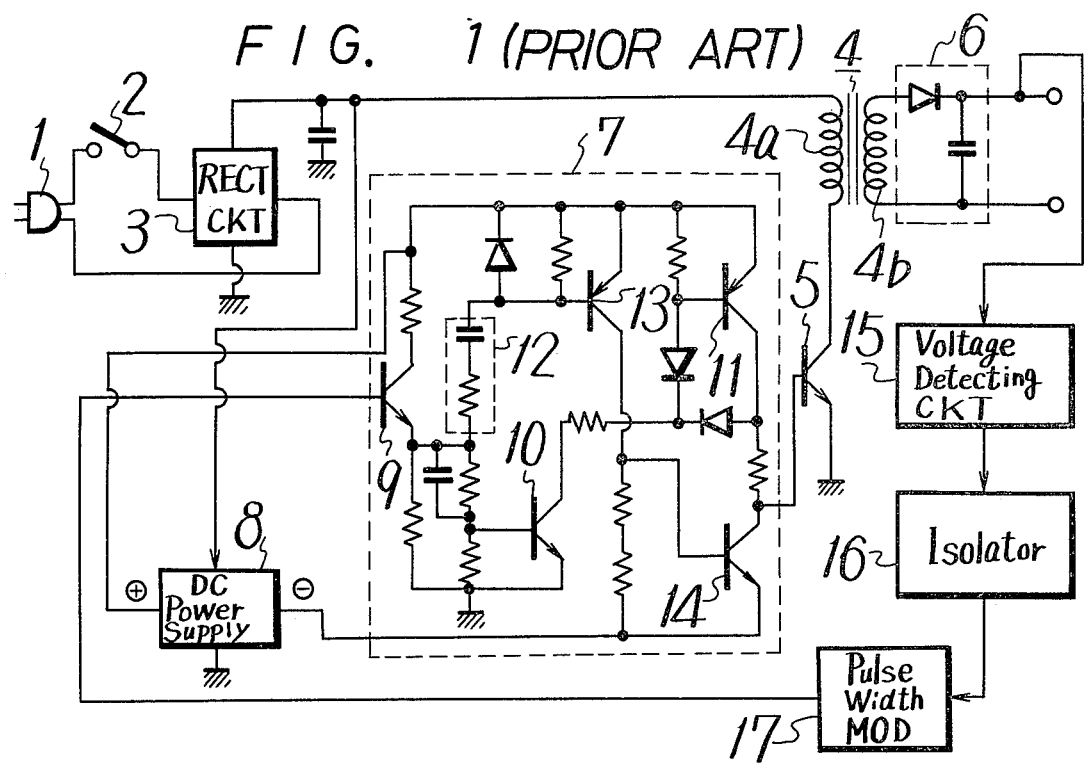
FIG. 1 is a circuit diagram showing an example of the prior art switching regulator.

An example of the switching regulator according to the present invention will be hereinafter described with reference to FIGS. 2 to 4, in which the parts corresponding to those of FIG. 1 are marked with the same reference numerals.

Figure 2:
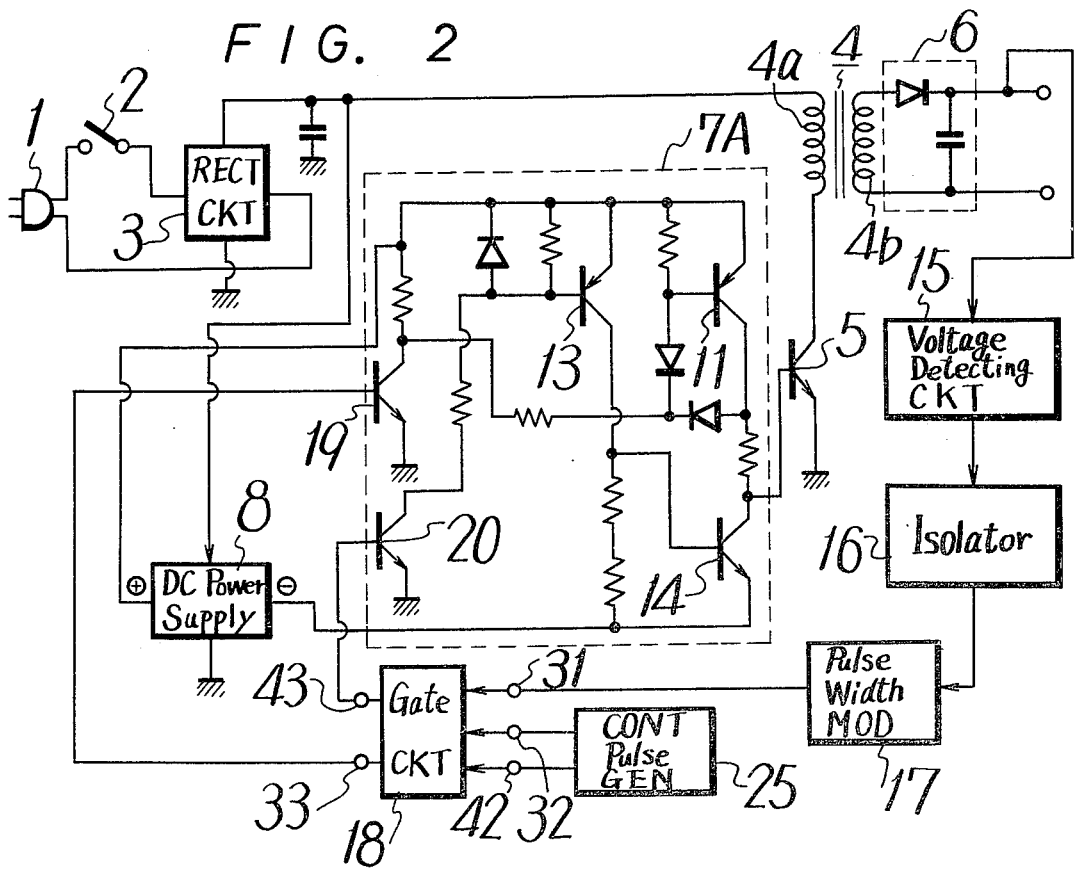
FIG. 2 is a circuit diagram showing an example of the switching regulator according to the present invention.

FIG. 2 is a connection diagram showing an example of the switching regulator according to the invention. In this example, there are provided a control pulse generator 25, which will produce such a control pulse that limits the maximum value of the duty ratio of the PWM signal from the pulse width modulator 17 and another control pulse which has the pulse width greater than that of the limiting pulse by a predetermined value, and a gate circuit 18 which will produce ON- and OFF-pulses by a manner described later in repsonse to the outputs of the control pulse generator 25, in addition to the pulse width modulator 17. From a theoretical point of view, the duty ratio of the PWM signal can be varied from 0% to 100%, but in practice if the duty ratio is varied from 0% to 100%, the switching transistor 5 can not operate normally due to its carrier storing effect. Therefore, in general, the limiting pulse is added to the PWM signal to provide PWM signals which have the maximum value of the duty ratio of 50%, 37.5%, 31.5%, and so on.

In the example of the invention shown in FIG. 2, the above limiting pulse and a control pulse having the pulse width greater than that of the former by a predetermined value are utilized to form the OFF-pulse for the switching transistor 5. A drive circuit 7A includes, in place of the transistors 9 and 10 and the differentiating circuit 12 used in the parior art circuit shown in FIG. 1, transistors 19 and 20 which are supplied with the above ON- and OFF-pulses, respectively. The transistor 19 becomes ON in response to the ON-pulse to turn the transistor 11 ON and hence to turn the switching transistor 5 ON. While the transistor 20 becomes ON in response to the OFF-pulse to turn the transistors 13 and 14 ON, to thereby connect the base of the switching transistor 5 to the negative side of the DC power supply source 8 and consequently turn the switching transistor 5 OFF. The other circuit construction of the invention is formed substantially the same as that of the prior art shown in FIG. 1.

FIG. 3 is an example of the gate circuit 18 used in the example of the invention shown in FIG. 2, in which the above ON-pulse and the OFF-pulse are provided digitally, and FIGS. 4A to 4E are waveforms thereof.

In the example of FIG. 3, the gate circuit 18 is formed of AND gate circuits 30 and 40, and an inverter 50. The PWM signal, i.e., ON-pulse $P_{ON}$, which is delivered from the pulse width modulator 17 (shown in FIG. 2) and has the waveform shown in FIG. 4A, is applied to one input terminal 31 and of the AND gate circuit 30, and also to the inverter 50 to be inverted as an inverted pulse $\overline{P_{ON}}$, which is shown in FIG. 4B and applied to one input terminal 41 of the other AND gate circuit 40. The other input terminal 32 of the AND gate circuit 30 is supplied with a control or limiting pulse $P_D$, which is delivered from the control pulse generator 25 (refer to FIG. 2) and has the waveform shown in FIG. 4C, for limiting the maximum value of the duty ratio of the PWM signal, while the other input terminal 42 of the AND gate circuit 40 is supplied with a control pulse $P_\alpha$, which is developed from the control pulse generator 25 and has the pulse width longer than that of the limiting pulse $P_D$ by a predetermined value $\alpha$, as shown in FIG. 4D. As a result, at an output terminal 33 of the AND gate circuit 30 there is obtained the ON-pulse $P_{ON}$ shown in FIG. 4A, and at an output terminal 43 of the AND gate circuit 40 there is obtained the OFF-pulse $P_{OFF}$ shown in FIG. 4E. In this case, the control pulse $P_{60}$ is provided in such a manner that when the duty ratio maximum value limiting pulses are formed to be of 50%, 37.5%, 31.3%, 25%, 12.5%, and 6.3%, respectively, the pulse $P_{60}$ is formed by combining the above pulses desirably. For example, if the limiting pulses of 50% and 12.5% are combined, the pulse $P_\alpha$ which has the maximum value 62.5% of the duty ratio can be obtained. Accordingly, the pulse $P_\alpha$ has the pulse width longer than that of the limiting pulse of 50% by a predetermined value, i.e., 12.5%.

Now, a description will be given on the operation of the switching regulator when the ON-pulse and OFF-pulse thus provided are applied thereto.

Turning to FIG. 2, when the ON-pulse $P_{ON}$ shown in FIG. 4A is applied to the base of the transistor 19, it turns ON. When the transistor 19 turns ON, the transistor 11 becomes ON and hence the switching transistor 5 becomes ON. This switching transistor 5 keeps its ON-state during the pulse width of the ON-pulse $P_{ON}$ and thereafter turns OFF. At the time when the switching transistor 5 turns OFF, if the OFF-pulse $P_{OFF}$ shown in FIG. 4E is applied to the base of the transistor 20 continuous to the ON-pulse $P_{ON}$, the transistor 20 turns ON and hence the transistors 13 and 14 become ON, respectively. Thus, the carrier stored in the base of the switching transistor 5 upon being in an ON-state is rapidly discharged. As a result, the failing-down time of the switching transistor 5 is shortened, so that a high speed switching operation becomes possible.

As may be apparent from the above description, according to the switching regulator of the present invention, the ON-pulse for the switching element or transistor is provided by the PWM signal and the limiting pulse, which limits the maximum value of the duty ratio of the PWM signal, and the OFF-pulse for turning OFF the switching element is provided by the same PWM signal, the limiting pulse and the control pulse which has the pulse width longer than that of the limiting pulse by the predetermined value. Then, the OFF-pulse is applied to the switching element continuous with the ON-pulse. Thus, the falling-down time of the switching element can be shortened and hence the switching speed of the switching element and its efficiency are improved. Further, the operation of the switching regulator of the invention is stable.

In the above example of the invention, the AND gate circuits and inverter are used to form the gate circuit which provides the ON- and OFF-pulses, but it will be apparent that other gate circuits can be used with the same effects.

The above description is given on the single preferred embodiment of the present invention, but it will be apparent that many modifications and variations could be effected by one skilled in the art without departing from the spirit or scope of the novel concepts of the present invention, so that the spirit or scope of the invention should be determined by the appended claims only.

We claim as our invention:

1. In a switching regulator including a DC voltage source having a pair of first and second DC output terminals, a switching transformer having primary and secondary windings and a magnetic core, a switching transistor having a control electrode, the main current path of which is connected in series between said first and second DC output terminals through said primary winding, rectifying means connected across said secondary winding and adapted to be connected with a load, and a pulse width modulator supplied with the output from said rectifying means so as to produce a PWM control signal the duty ratio of which is proportional to the voltage of said rectifying means, said switching regulator further comprising:

(a) control pulse generating means for producing a first control pulse signal which limits the maximum duty ratio of said PWM control signal and a second control pulse signal which has the duty ratio larger than that of said first control pulse signal;
   (b) first gate circuit means supplied with said PWM control signal and said first control pulse signal to produce an ON- pulse at the output terminal thereof;
   (c) second gate circuit means supplied with said PWM control signal and said second control pulse signal to produce an OFF pulse at the output terminal thereof; and
   (d) circuit means for supplying the said ON and OFF pulse signals to said switching transistor so as to switch ON or OFF the same.

2. In a switching regulator including a DC voltage source having a pair of first and second DC output terminals, a switching transformer having primary and secondary windings and a magnetic core, a switching transistor having a control electrode, the main current path of which is connected in series between said first and second DC output terminals through said primary winding, rectifying means connected across said secondary windings and adapted to be connected with a load, and a pulse width modulator supplied with the output from said rectifying means so as to produce a PWM control signal the duty ratio of which is proportional to the voltage of said rectifying means, said switching regulator further comprising:

(a) control pulse generating means for producing a first control pulse signal which limits the maximum duty ratio of said PWM control signal and a second control pulse signal which has the duty ratio larger than that of said first control pulse signal;
   (b) first gate circuit means supplied with said PWM control signal and said first control pulse signal to produce an ON-pulse at the output terminal thereof;
   (c) second gate circuit means supplied with said PWM control signal and said second control pulse signal to produce an OFF pulse at the output terminal thereof; and
   (d) circuit means for supplying the said ON and OFF pulse signals to said switching transistor so as to switch ON or OFF the same;
   said gate circuit means comprising a first AND gate circuit having a pair of input terminals supplied with said PWM control signal and said first control pulse and an output terminal producing said ON-pulse, and a second AND gate circuit having a pair of input terminals supplied with the inverted signal of said PWM control signal and said second control pulse and an output terminal producing said OFF-pulse.

3. A switching regulator according to claim 2, in which said inverted PWM control signal is derived by an inverter connected between the output of said pulse width modulator and one of the pair of input terminals of said second AND gate circuit.

4. A switching regulator according to claim 2, further comprising a first drive circuit connected between the output terminal of said first AND gate circuit and the control electrode of said switching transistor, and a second drive circuit connected between the output terminal of said second AND gate circuit and the control electrode of said switching transistor.

5. A switching regulator according to claim 4, in which said first drive circuit comprises a first drive transistor having a base, emitter and collector, the base of which is supplied with said ON pulse from said first AND gate circuit and the emitter-collector circuit of which is connected in a common emitter circuit, and a second drive transistor having a base, emitter and collector, the base of which is connected to the collector of said first drive transistor, the emitter-collector circuit of which is connected in a common emitter circuit, and the collector of which is connected to the control electrode of said switching transistor.

6. A switching regulator according to claim 4, in which said second drive circuit comprises a third drive transistor having a base, emitter and collector, the base of which is supplied with said OFF-pulse from said second AND gate circuit and the collector-emitter circuit of which is connected in a common emitter circuit; a fourth drive transistor having a base, emitter and collector, the base of which is connected to the collector of said third drive transistor and the collector-emitter circuit of which is connected in a common emitter circuit; and a fifth drive transistor having a base, emitter and collector, the base of which is connected to the collector of said fourth drive transistor, the collector-emitter circuit of which is connected in a common emitter circuit and the collector of which is connected to the control electrode of said switching transistor.

* * * * *